United States Patent [19]

Phenicie et al.

[11] Patent Number: 5,185,193
[45] Date of Patent: Feb. 9, 1993

[54] INTERLOCKABLE STRUCTURAL MEMBERS AND FOLDABLE DOUBLE WALL CONTAINERS ASSEMBLED THEREFROM

[75] Inventors: Ronald W. Phenicie; Peter E. Dahlquist, both of Warrenton, Va.

[73] Assignee: Case Designers Corporation, Warrenton, Va.

[21] Appl. No.: 688,255

[22] Filed: Apr. 22, 1991

Related U.S. Application Data

[63] Continuation-in-part of Ser. No. 637,542, Jan. 4, 1991.

[51] Int. Cl.$^5$ .............................................. B32B 3/00
[52] U.S. Cl. ......................................... 428/57; 428/58; 428/60; 428/61; 52/536; 52/588; 220/1.5; 404/41
[58] Field of Search ................ 428/60, 61, 58, 57; 52/588, 536; 220/1.5, 4.26, 4.27, 4.29, 6, 7; 160/232; 404/41; 403/335, 336, DIG. 10

[56] References Cited

U.S. PATENT DOCUMENTS

| | | | |
|---|---|---|---|
| 3,039,575 | 6/1962 | Graham | 52/578 |
| 3,332,192 | 7/1967 | Kessler | 52/588 |
| 3,884,444 | 5/1975 | Dashew | 52/588 |
| 4,091,950 | 5/1978 | Craven | 220/1.5 |
| 4,214,669 | 7/1980 | McQuiston | 220/1.5 |
| 4,577,772 | 3/1986 | Bigliardi | 220/1.5 |
| 5,050,362 | 9/1991 | Tal | 52/588 |

*Primary Examiner*—Ellis P. Robinson
*Assistant Examiner*—Nasser Ahmad
*Attorney, Agent, or Firm*—Kenyon & Kenyon

[57] ABSTRACT

The individual structural member of the invention includes a pair of parallel panels which are spaced from each other to define a cavity therebetween. The panels are staggered in the longitudinal direction so that an end section of one panel extends beyond an end of the other panel and vice versa to form a front extension section and a rear extension section of the structural member. The non-extension end edge of each panel is connected to the opposing panel by flat walls. Each extension section is provided with a flange. The front section flange of one structural member is adapted to interlock with the rear section flange of another structural member so that the structural members can be assembled in end to end fashion with the panels of one structural member being coplanar with the panels of adjoining structural members to form a double wall of, for example, a container.

14 Claims, 11 Drawing Sheets

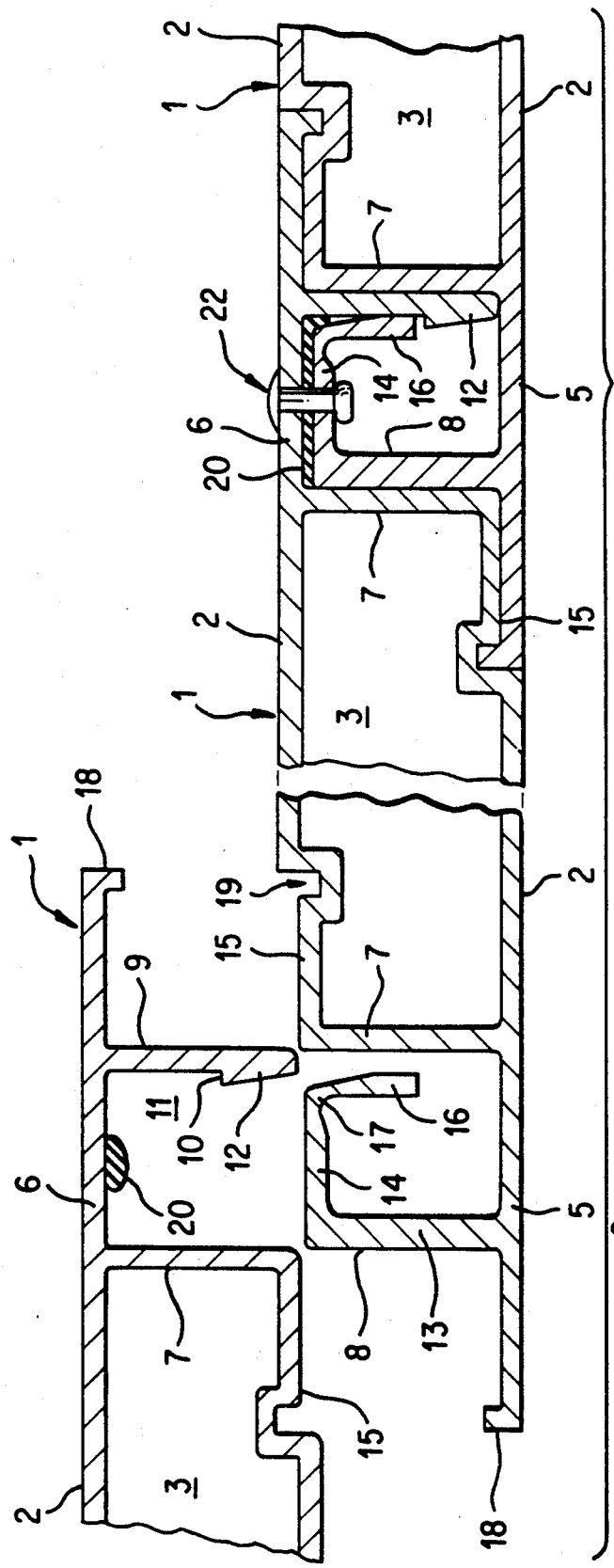
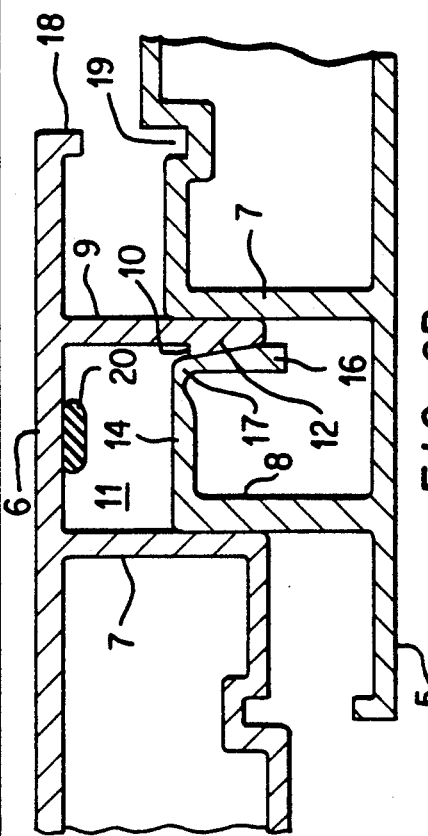
FIG. 2A
FIG. 2B 5,185,193

INTERLOCKABLE STRUCTURAL MEMBERS AND FOLDABLE DOUBLE WALL CONTAINERS ASSEMBLED THEREFROM

BACKGROUND OF THE INVENTION

This is a continuation in part of application Ser. No. 07/637,542, filed on Jan. 4, 1991, now pending.

FIELD OF THE INVENTION

The invention relates to structural members which can be interlocked in end to end fashion to assemble a double wall. More particularly, the invention relates to such structural members which can be assembled into containers and foldable containers for the transportation and storage of goods.

DESCRIPTION OF RELATED ART

Containers are used for the transportation and storage of goods. Typically, containers are mounted onto the chassis of a truck cab for transportation. The containers can be removed from the chassis and placed onto another transportation vehicle such as a rail box car, an aircraft, or a ship for an overseas destination.

One major drawback of conventional containers is that they are of a fixed standard size which cannot be altered to accommodate varying load sizes or transportation vehicle dimensions. At a shipping port or other loading site it is not feasible to construct conventional containers according to particular dimensional specifications.

Numerous disadvantages follow from this major drawback. For example, since a conventional container is completely assembled it is not possible to subsequently attach hardware without violating the container. This is due to the fact that it is not possible to remove an individual container panel independently of the other panels to permit direct access into the inside of the container.

In the case of double wall containers, it is not possible to select at the loading site whether the cavity between the walls is to be flushed with, for example, hot air or cold air to help maintain the temperature inside the container, or, whether the cavity is to contain foam, other insulating materials or electrical wiring and the like.

Further drawbacks of conventional containers are that they often do not have substantial vertical strength for stacking purposes and that they are often not effectively sealed air tight, rain tight or splash proof.

Accordingly, it is an object of the invention to provide structural members which can be interlocked in end to end fashion to readily assemble a double wall.

It is a further object of the invention to provide structural members of the type described in the preceding paragraph which can be easily assembled into a double wall container according to particular specifications.

It is yet a further object of the invention to provide a double wall container which has substantial vertical strength so that multiple containers can be stacked.

It is an additional object of the invention to provide a foldable and portable double wall container which is effectively sealed rain tight and splash proof when fully assembled.

SUMMARY OF THE INVENTION

The individual structural member of the invention includes a pair of parallel panels which are spaced from each other to define a cavity therebetween. The panels are staggered in the longitudinal direction so that an end section of one panel extends beyond an end of the other panel and vice versa to form a front extension section and a rear extension section of the structural member. The non-extension end edge of each panel is connected to the opposing panel by a flat connecting wall. The connecting walls are parallel to each other.

Each extension section is provided with a different flange. The front section flange of one structural member is adapted to interlock with the rear section flange of another structural member so that the structural members can be assembled in end to end fashion with the panels of one structural member being co-planar with the panels of adjoining structural members to form a double wall. Each panel can be formed with an inward indentation in which case the end of each extension section has an inwardly projecting lip which is adapted to be received within the indentation of an adjoining structural member in the assembled position for improved stability.

Assembled double walls can be joined at their ends by hinges to form a foldable and portable container. Elongated channelled members can be fit around the tops and bottoms of the assembled container double walls to stabilize the container. For vertical stacking purposes, elongated channelled members can be affixed to bottoms of the assembled container walls with their channels depending outwardly and adapted to receive the top of the walls of a container stacked below, or, in the case of the bottom container a pallet which can function as a floor.

BRIEF DESCRIPTION OF THE DRAWINGS

FIG. 2 is a detailed cross-sectional view of structural members in accordance with the invention being assembled to form a double wall.

DESCRIPTION OF THE INVENTION

Figure 1:
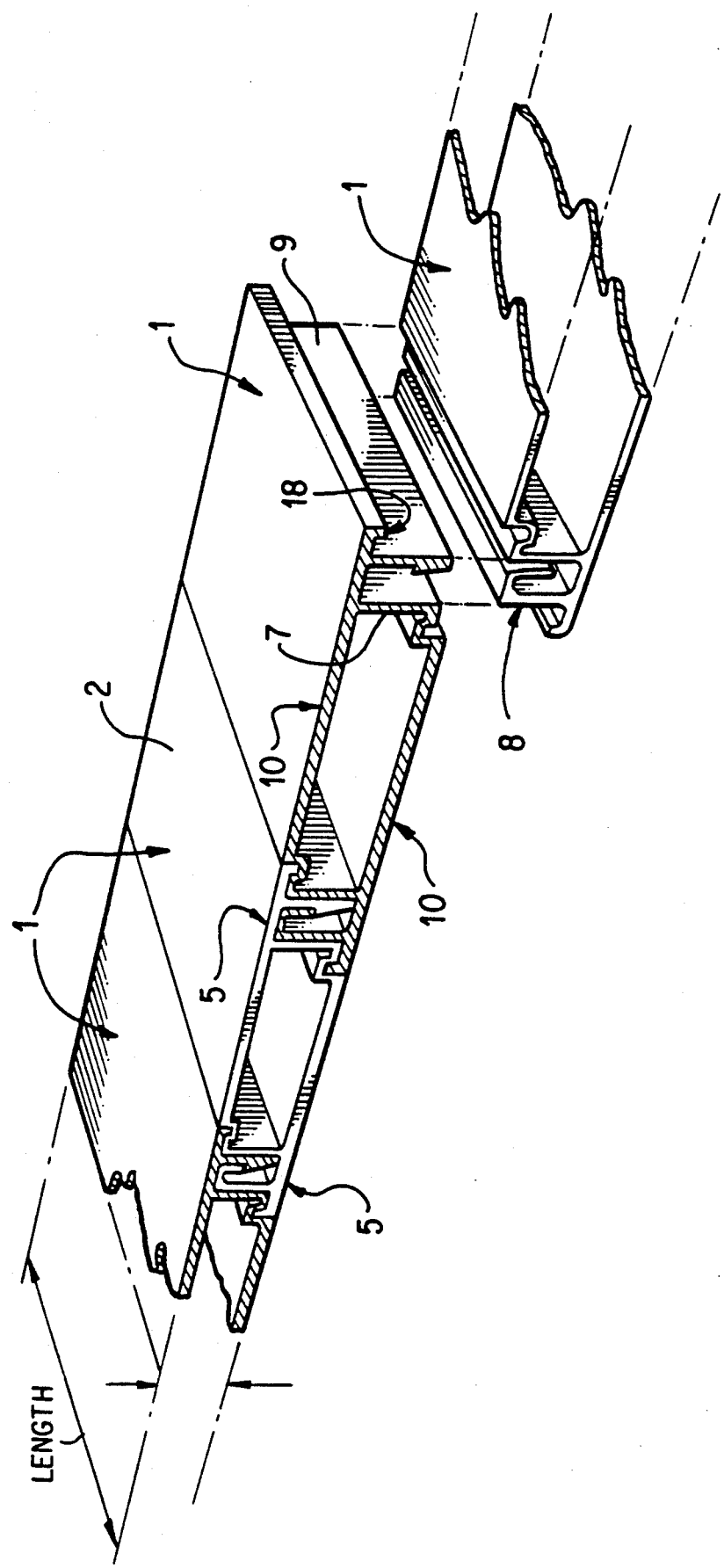
FIG. 1 is a perspective view of structural members of the invention assembled in end to end fashion to form a double wall.

Referring to FIG. 2 a detailed cross-sectional view of structural members in accordance with the invention are illustrated. Each structural member 1 includes a pair of parallel panels 2 which are spaced apart to define a cavity 3 therebetween. As illustrated, panels 2 are substantially planar except at non-extension end sections 15 as indicated hereinafter. As illustrated, panels 2 of a structural member 1 are staggered in the longitudinal direction so that an end section of one panel extends beyond an end section of the opposing panel and vice versa to define rear extension 5 and front extension 6 of structural member 1.

Opposing panels 2 of a structural member 1 are joined by connecting walls 7 which are normal to the plane of panels 2. As illustrated in FIG. 2, each wall 7 connects the end of non-extension end section 15 of one panel to the other panel to further circumscribe the cavity 3.

Rear extension 5 of a structural member 1 has a flange 8 which is adapted to interlock with a flange wall 9 belonging to the front extension 6 of another structural member. Of course, it should be appreciated that positions can be rearranged so that flange wall 9 belongs to the front extension and flange 8 belongs to the rear extension. This can be accomplished by merely rotating the structural member to reverse front and rear positions.

Flange wall 9 is normal to the plane of front extension 6 of panel 2. Flange wall 9 is co-extensive in length and width with nearest connecting wall 7 and is parallel to wall 7. An open flange receiving cavity 11 is therefore present between walls 9 and 7 and front extension 6. As will be seen, the width of the inside of cavity 11 as defined between walls 7 and 9 is such that cavity 11 can receive flange 8 of another identical structural member.

As illustrated, flange wall 9 has a distal end section or head 12 which has an inside surface facing cavity 11 which is angled inwardly toward cavity 11 thereby widening the thickness of flange wall 9 in the direction toward front extension 6 to which flange wall 9 is joined. Head 12 ends abruptly at ledge 10 which will be formed with flange wall.

Flange 8 includes a side wall 13 which is normal to the plane of the rear extension 5 of panel 2. Side wall 13 is co-extensive in length and width with nearest connecting wall 7 and is parallel to wall 7. The end of side wall 13 which is not attached to rear extension 5 is formed with or attached to an inwardly depending base wall 14 which is normal to side wall 13 Base wall 14 is co-planar with the nearest non-extension end section 15 of the panel to which side wall 13 is not attached.

The end of base wall 14 which is not attached to side wall 13 is formed with or attached to a lip 16 which depends in the direction toward rear extension 5 to which side wall 13 is attached. Preferably, the area where lip 16 is joined to base wall 14 is thinned as compared to the base wall and lip so as to create a resilient flex point 17 about which lip 16 can flex.

As illustrated, the length of base wall 14 is such that a gap is left between lip 16 and nearest connecting wall 7. The gap is of a size which can snugly receive flange wall 9 of another structural member. The length of lip 16 must not be so long as to extend beyond ledge 10 of a flange wall 9 when flange 8 is completely received within cavity 11 (which occurs when base wall 14 makes wall to wall contact with extension end section 6) (see FIG. 2) Preferably, lip 16 is of a length such that it would snugly fit between ledge 10 and front extension 6 when flange 8 is completely received within cavity 11 so that wall to wall contact of the flange 8 with the receiving cavity walls (i.e., 7, 6 and 9) is made.

When panels 2 have a thickness, the non-extension end section 15 of each panel 2 is displaced inwardly toward the opposing panel to accommodate for the thickness of an adjoining panel when the structural members are joined (see FIGS. 1 and 2). The extent of displacement should be equal to the thickness of panels 2. The reason for the displacement is to allow for space for the rear extension or the front extension (as the case may be) of an adjoining structural member when structural members are joined end to end (see FIG. 2). In this way, adjoining panels of the assembled double wall structure will be co-planar as illustrated in FIG. 1.

Preferably, the end of each of the extensions 5, 6 is formed with or has attached thereto a small lip 18 which projects in a direction which is generally normal to the plane of the extension. Where such lips 18 are present, panels 2 are formed with a complimentary channel 19 at the point of displacement of non-extension end section 15 from the remainder of panel 2. The channel 19 is of a size and shape so that it can snugly receive lip 18 of an adjoining structural member during assembly. The engagement of lip 18 with channel 19 of an adjoining structural member helps to prevent separation (i.e., by bending apart) of adjoining structural members which are interlocked. A further advantage of the engagement of lip 18 with channel 19 is that in the assembled double wall (of a container, for example), tension or compressive stress caused by loading will be transferred along adjacent panels along the full width of the double wall.

In order to interlock one structural member with another, flange 8 of one structural member is merely inserted into the receiving cavity of another structural member. During the insertion step, lip 16 of flange 8 will flex as it moves past the head 12 of flange wall 9 of the adjoining structural member. As the end of lip 16 moves past ledge 10 the lip 16 will snap back to its normal non-flexed position thereby interlocking flange 8 and flange wall 9. Ledge 10 will therefore function to prevent easy separation of the interlocked structural members. As previously stated, the dimensions of the flanges are selected so that flange 8 fits snugly within cavity 11. In this way, wall to wall contact will be made by the walls and lip of flange 8 (i.e., 13, 14 and 16) with the walls of cavity II (i.e., 7, 6 and 9), respectively.

As illustrated, the connecting walls 7, flange wall 9 and side wall 13 are all normal to the panel to which they belong. However, it should be appreciated that this is not required. For example, if the connecting walls 7, flange wall 9, side wall 13 and lip 16 are all parallel to each other, the structural members of the invention will interlock so that wall to wall contact will be made when flange 8 is completely inserted within cavity 11, notwithstanding the fact that the walls 7, 9 and 13 are not normal to panels 2. Of course, this arrangement is also within the scope of the present invention.

One advantage of the present invention is that the interlocked flanges provide a torturous path for air attempting to cross the double wall formed from the structural members. Thus, the double wall has excellent insulating-sealing properties. In order to further enhance the sealing properties of the double wall, a bead of adhesive/sealant 20 (for example, silicon) may be placed between the exterior of flange 8 and the interior of cavity 11. When the flanges are interlocked, the adhesive/sealant will spread between the flange walls. Of course, an adhesive will also function to help prevent separation of the structural members. Double sided tapes may be used in place of adhesive for this purpose. Additionally, mechanical fasteners (rivets 22, screws and the like) may be used to prevent separation of the structural members.

Figure 8:
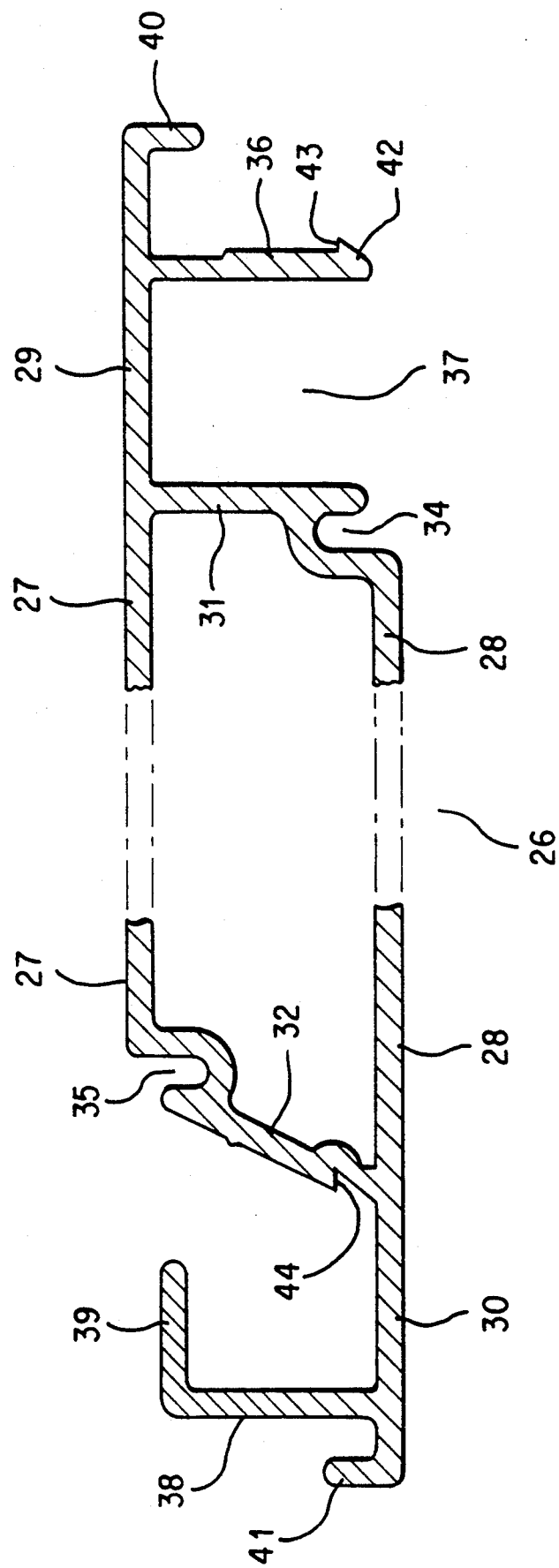
FIG. 8 is a detailed cross-sectional view of another embodiment of the structural member of the invention.
Figure 9:
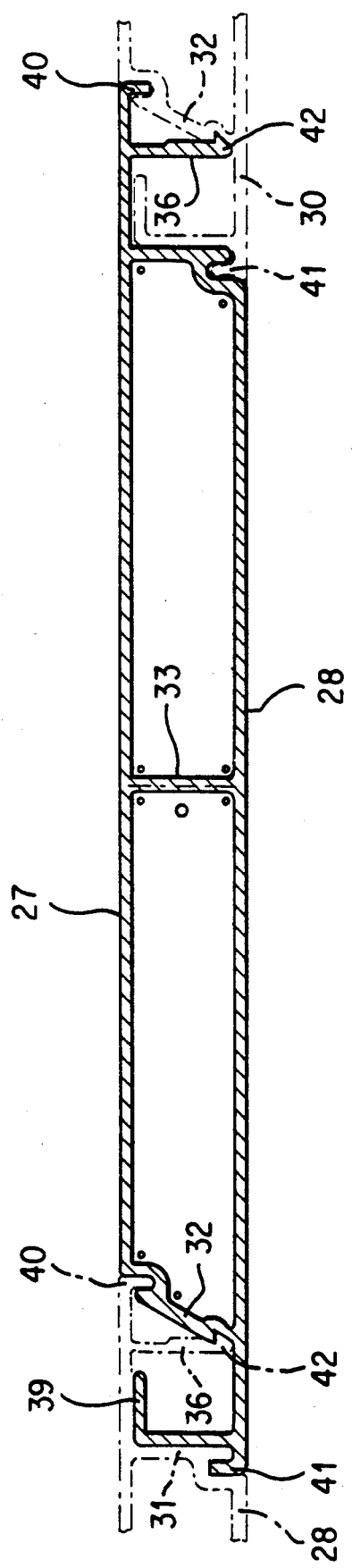
FIG. 9 is a cross-sectional view of structural members of FIG. 8 interlocked end to end.

Referring to FIGS. 8 and 9 another embodiment of the structural member of the invention is illustrated. The structural member 26 includes parallel opposing panels 27 and 28 which are staggered in the longitudinal direction. This staggered relationship results in an end section of each panel extending beyond an end of the opposing panel, referred to as extension end sections 29 and 30. Connecting walls 31 and 32 join the non-extension end of each panel to the opposing panel. Another connecting wall 33 may join the panels near the middle of the structural member for reinforcement. Each panel 27 and 28 is formed with a slot 34 and 35 preferably located near the non-extension end of the panel.

Figure 11A:
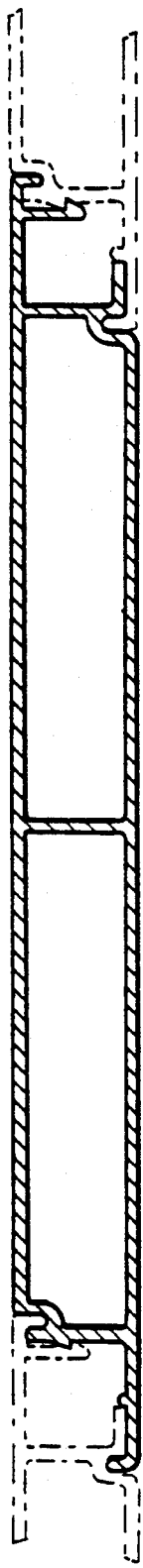
FIG. 11 is a detailed cross-sectional view of another embodiment of the structural member of the invention.
Figure 11B:
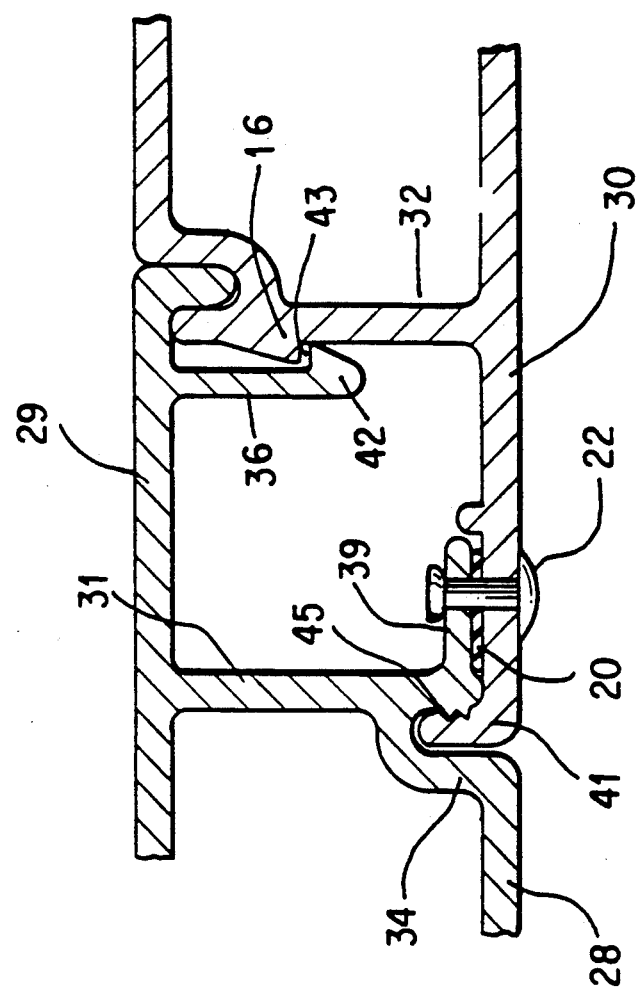

The extension end section 29 of one panel 27 is formed with a flange wall 36 which is preferably normal to the panel. The flange wall 36, section 29 and connecting wall 31 define an open flange receiving cavity 37. The extension end section 30 of the other panel 28 is formed with a flange which includes a side wall 38, parallel to connecting wall 31, and a base wall 39, parallel to section 30. Walls 36, 38 and 39 are of dimensions and are positioned such that a flange (i.e., side wall 38 and base wall 39) of one structural member may be snugly received within the flange receiving cavity 37 of an adjoining structural member to make near wall to wall contact. For this purpose it can be seen that base wall 39 is not in coplanar relationship with panel 27, but is offset by a distance approximately equal to the thickness of the panels so as to allow room for section 29 of an adjoining structural member and adhesive or double sided tape. Referring to FIG. 11, base wall 39 may be located normal to connecting wall 31. Base wall 39 is not in coplanar relationship with panel 28. It can be seen that cooperation of base wall 39 and extension end panel 30 allows a slight dimensional void to receive adhesive sealant 20. Additionally, base wall 39 and extension end panel 30 may be mechanically attached by fasteners (rivets 22, screws and the like). It is preferred to allow location of wall 39 to be either normal to side wall 38 or connecting wall 31, never both. Circumstances may dictate adhesive sealant 20 or mechanical fasteners (rivets 22, screws and the like) to be located near to and cooperate with section 29 or extension end panel 30, never both. In this way the structural members may be connected end to end as illustrated in FIG. 9 to form a smooth double wall.

The tip of each extension end section 29 and 30 is formed with a lip 40 and 41 which is adapted to be received within slots 35 and 34, respectively, of an adjoining structural member. Lip 41 and slot 34 include hill and valley details 45 that cooperate to enhance positive engagement. Engagement of lips 40 and 41 with slots 35 and 34 assists in the interlocking of adjoining structural members.

Flange wall 36 is formed with a head 42 at its tip. Head 42 is an area of widened thickness relative to the remainder of flange wall 36. 36 Head 42 terminates abruptly at a point to define a ledge 43 (shown as lip 43 in FIG. 11). The connecting wall 32 is formed with a notch 44 near its point of joinder to end section 30. Notch 44 is positioned and adapted such that it will snugly receive the head 42 of flange wall 36 when two structural members are interlocked. Flange wall 36 is preferably resiliently flexible so that head 42 will snap into notch 44 when the structural members are interlocked. It can be seen that the cooperation of ledge 43 with notch 44 will assist in the interlocking of the structural members and will help prevent their separation.

As illustrated, connecting wall 32 is not normal to panels 27 and 28. Rather, connecting wall 32 forms an acute interior angle with panel 28 (or an obtuse angle with end section 30). This relationship is preferred because it allows for better engagement of head 42 in notch 44, however, connecting wall 32 may also be normal to panel 28. As shown in FIG. 11 instead of a notch, a ledge 16' extends from wall 32' for overlapping engagement with lip 43.

The structural member of the invention may be constructed of aluminum which has the advantage of being recyclable and which can be easily cut to meet height specifications. The structural member may also be extruded from other recyclable metals, plastics or composite materials. Instead of extrusion, the structural member may be mechanically formed (i.e., bent) from a sheet.

Figure 3:
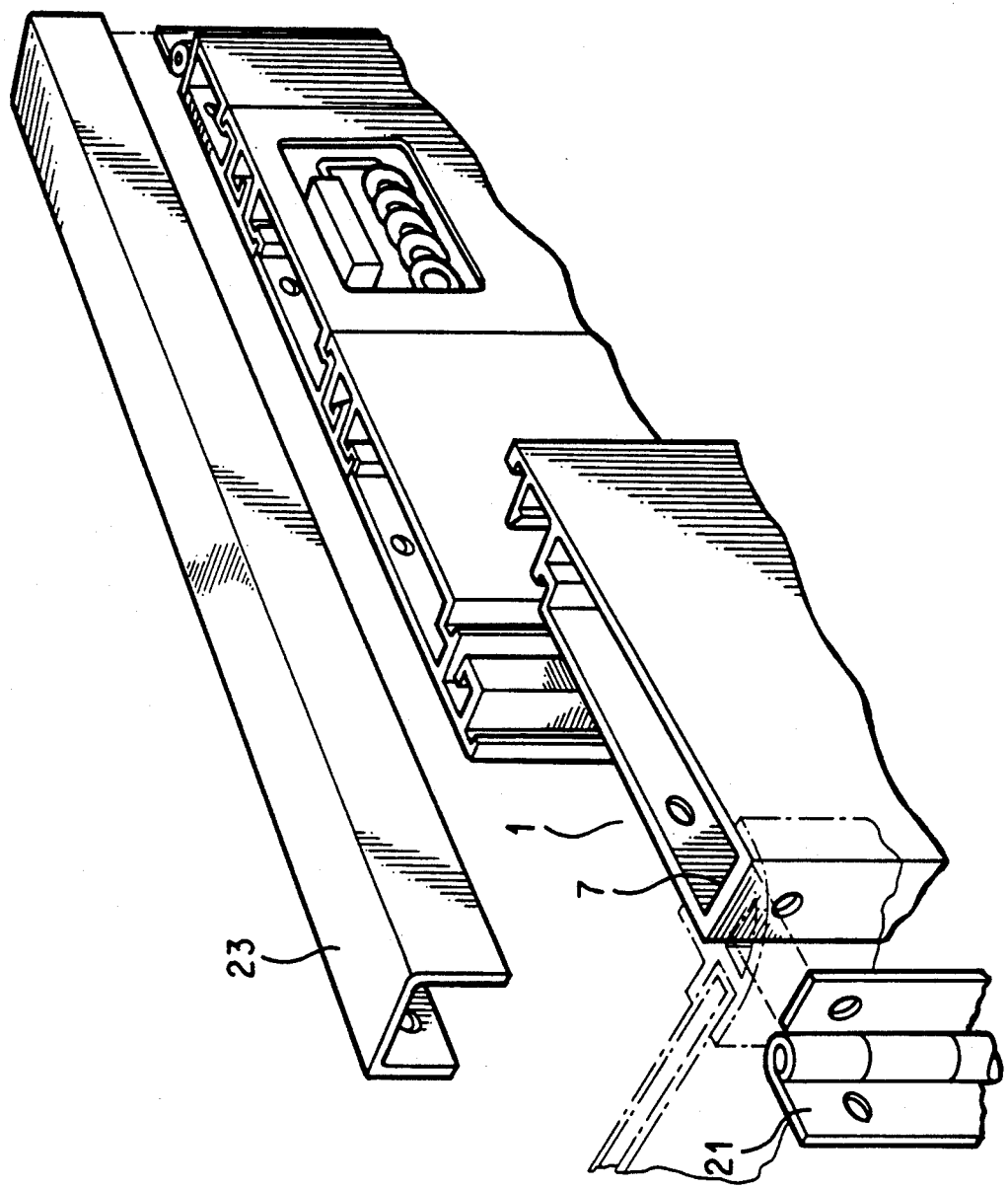
FIG. 3 is an angular view of two hinged container walls and an elongated channelled member used to cover the top of a double wall.
Figure 4:
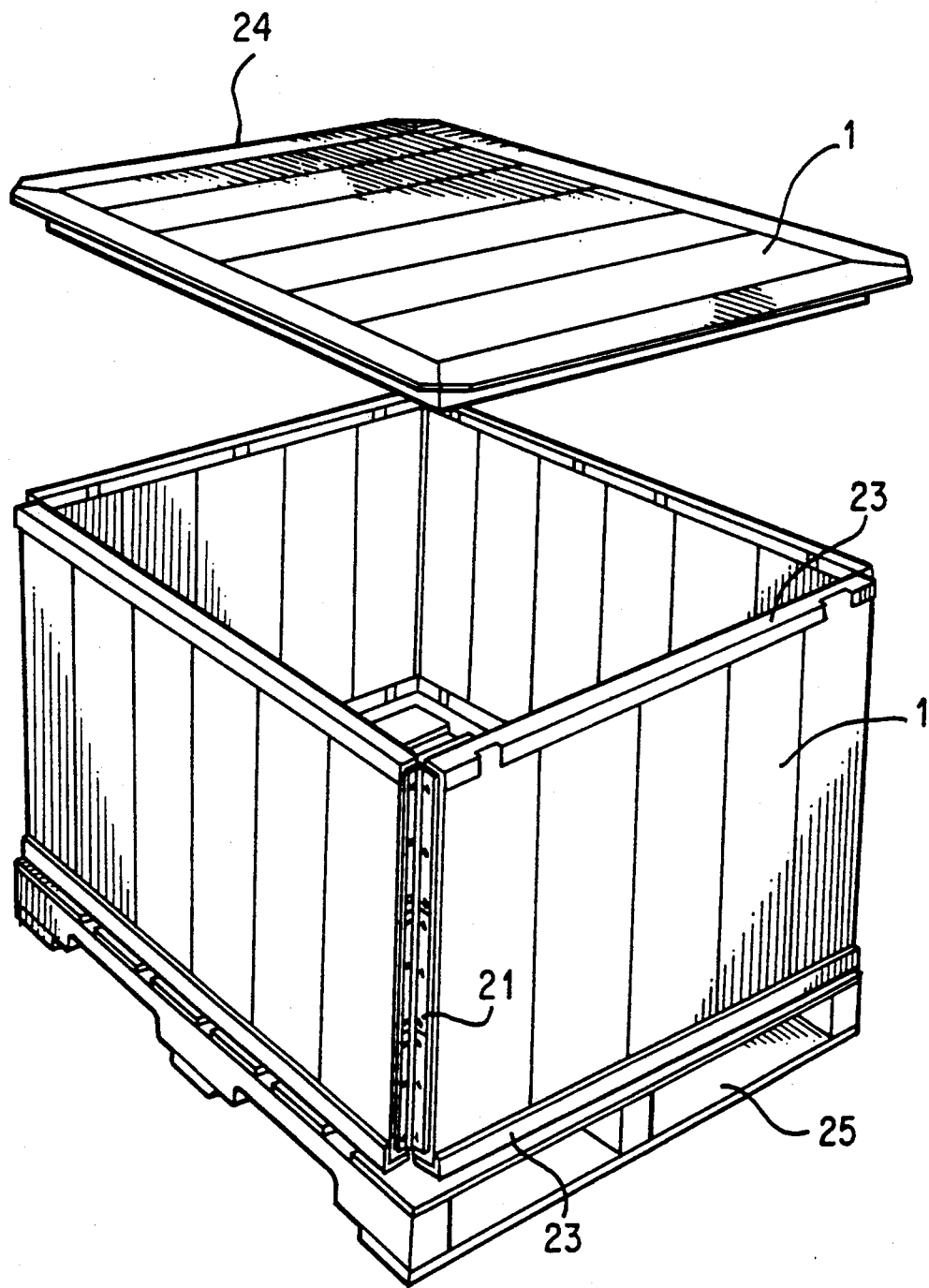
FIG. 4 illustrates a foldable assembled container on a pallet in accordance with the invention.

Double walls assembled from the structural members of the present invention may be easily assembled into double wall containers (see FIG. 4). For this purpose, the structural members which are at the ends of each double wall should not have any extension 5 or 6 nor any flange 8 or 9 at one end so that the double wall can be more easily joined to another double wall. As illustrated in FIG. 3, these terminal structural members will terminate at connecting wall 7.

Figure 5:
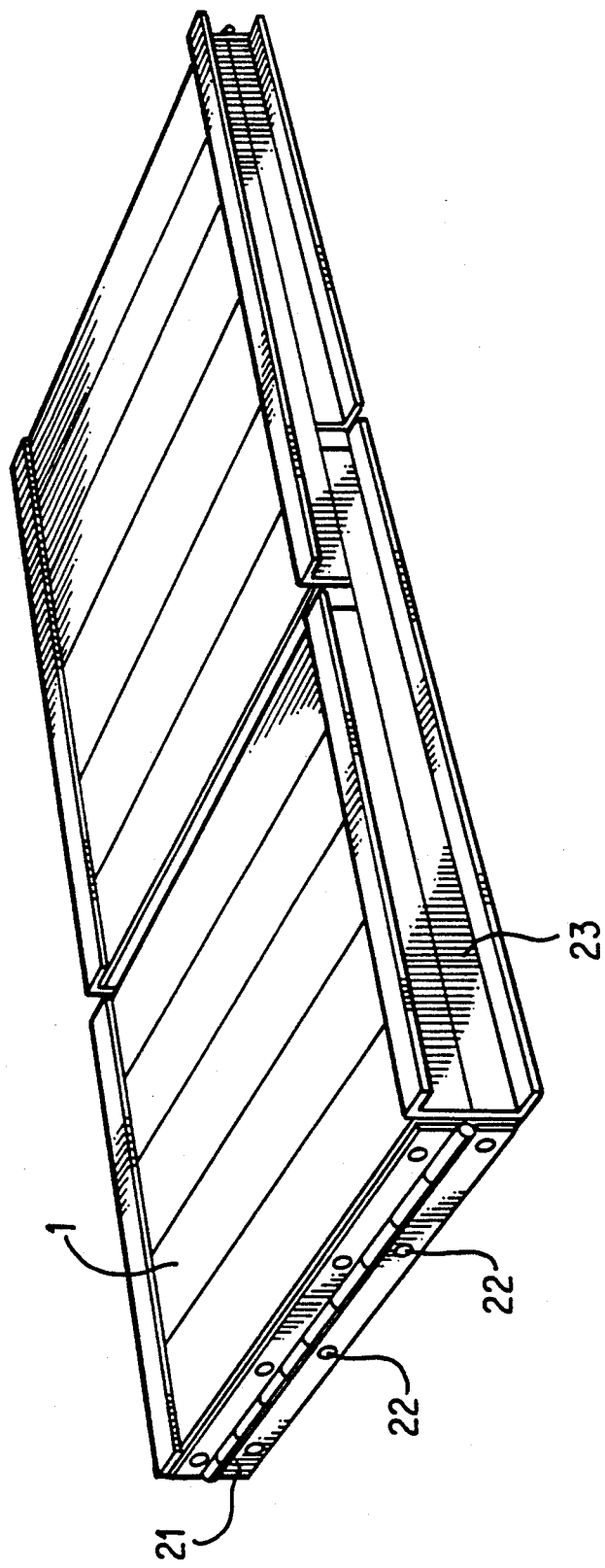
FIG. 5 illustrates the container of FIG. 4 in its folded compact position.
Figure 7:
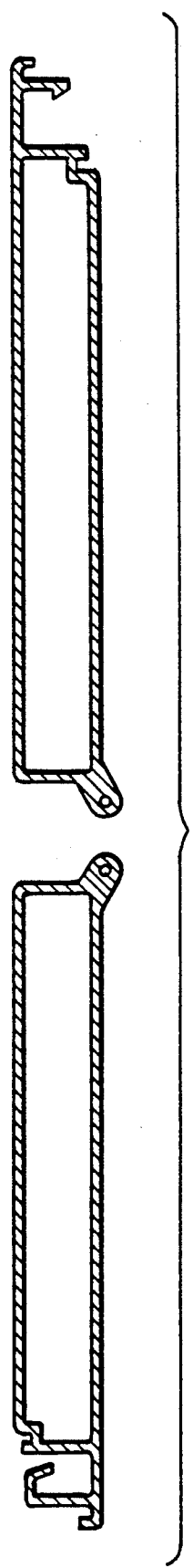
FIG. 7 is a cross-sectional view of a terminal structural member for forming a corner or fold line of a foldable container.

The end edge of each double wall is joined to an end edge of another double wall by a joint which is preferably a hinge 21 so that adjoined container walls may be folded over each other into a more portable flat structure (see FIG. 5). The walls can be joined to the joint or hinge 21 by mechanical fasteners (rivets 22, screws and the like). Alternatively, the terminal structural members themselves can be formed with hinges 21 as illustrated in FIG. 7.

Figure 10:
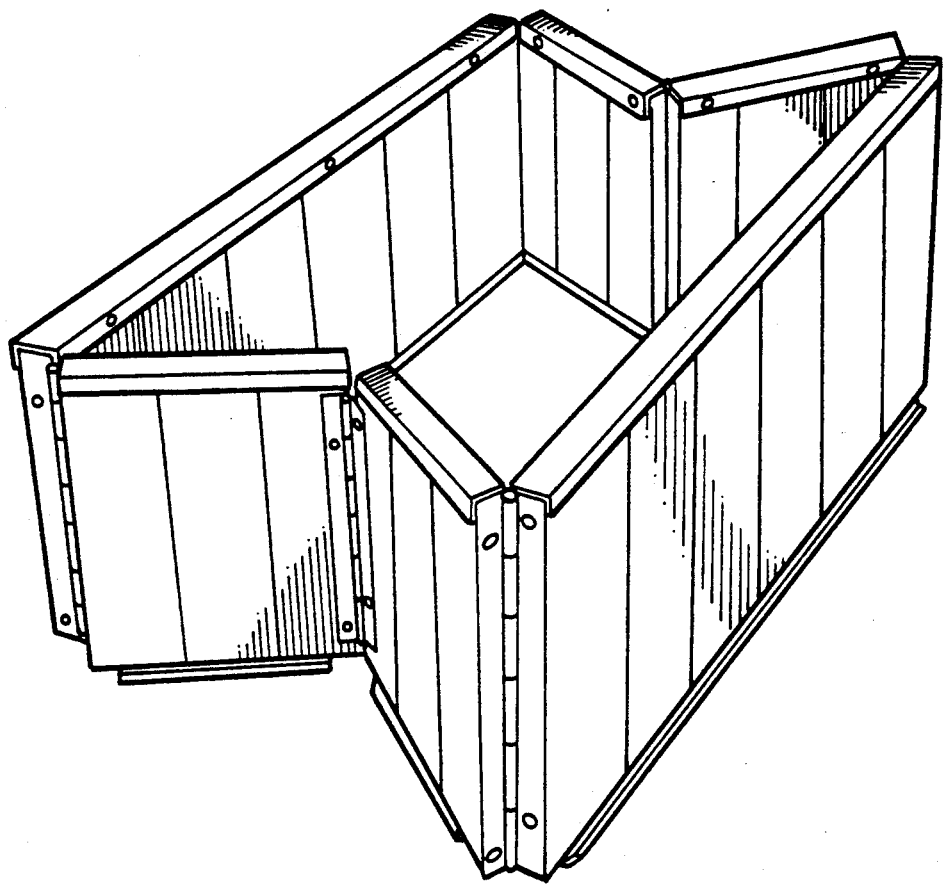
FIG. 10 illustrates a foldable container constructed from the structural members of the invention.

Four double walls can be used to form the side walls of a container (see FIG. 4). As illustrated in FIG. 10, a foldable container may be constructed using terminal structural members at the corners of the container and in two opposing walls of the container. A container floor can also be joined to the side walls by mechanical fasteners (rivets 22, screws and the like).

Figure 6:
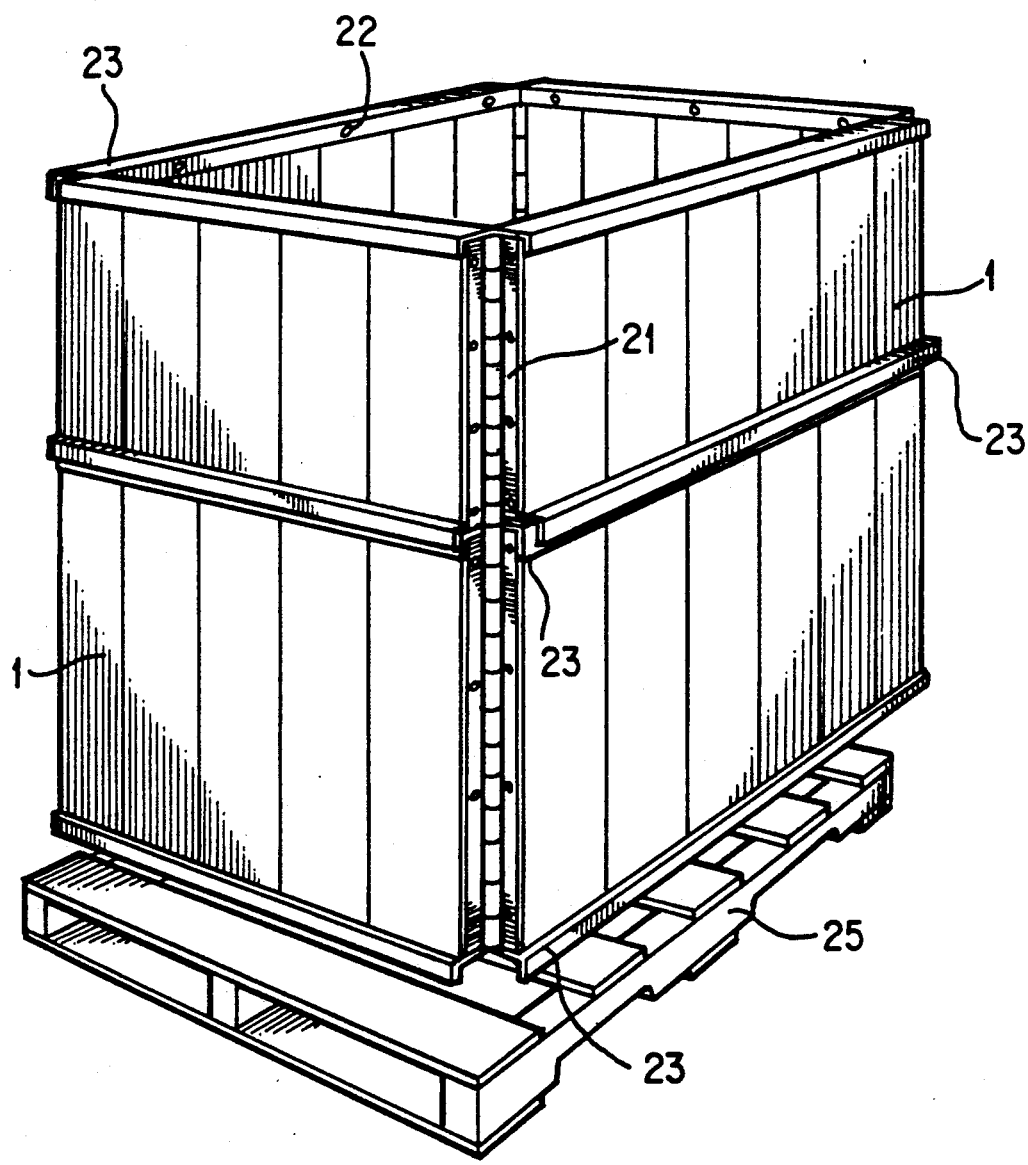
FIG. 6 illustrates two containers in accordance with the invention which are vertically stacked.

The top and bottom of the double walls can be covered by elongated channelled members 23 (see FIG. 3) for stability and protection. Mechanical fasteners (rivets 22, screws and the like) can attach the channelled member. For improved stability when the containers are vertically stacked (see FIG. 6), elongated channelled members can be attached to the bottom of the double walls so that the channels face outward rather than covering the wall. In this way, the channelled member on the bottom of a container wall can receive in its channel the top of a container wall stacked beneath it. This arrangement improves the lateral stability of stacked containers. It should be appreciated that one important advantage of the present invention is that the double wall structural members provide containers with substantial vertical stacking strength.

The container lid or cover 24 may also be formed from the double wall structural member of the invention (see FIG. 4). The lid or cover may be strapped to the container or a conventional catch and strike may be used.

One preferred container which can be constructed has four side double walls joined at 90' angles at their edges by hinges 21 (see FIG. 4). Elongated channelled members 23 are attached to the bottom of the container walls so that their channels face outward as described in the preceding paragraph. The channelled members can be secured to a pallet 25 which will serve as the container floor. The container can be removed from the pallet and easily folded up as illustrated in FIG. 5.

The containers of the present invention can be constructed in advance according to specifications and then shipped to a loading or shipping site. Alternatively, the structural members of the invention can be shipped in kits and then assembled on location. One advantage of the invention is that a strong double wall container can be easily assembled, using simple hand tools, at a loading or shipping location to accommodate varying load sizes and/or the varying dimensions of transporting vehicles and goods.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than a restrictive sense.

What is claimed is:

1. A end to end interlockable structural member for assembling a double wall comprising:
    a pair of spaced apart parallel panels, the panels being staggered in a longitudinal direction so that an extension end section of each panel extends in the longitudinal direction beyond a non-extension end of the other panel, each panel being formed with a channel extending in a widthwise direction across the panel;
    a first and a second connecting wall, each connecting wall joining the non-extension end of a panel to the other panel, the first connecting wall having a notch therein;
    a flange wall extending at an angle from the extension end section of one panel so as to define an open flange receiving cavity between the second connecting wall, said extension end section and the flange wall, said flange wall having a head which is engageable with the notch of another identical structural member;
    a flange belonging to the extension end section which extends beyond the first connecting wall, the flange comprising a side wall originating at an angle from said extension end section to a terminal point;
    a first lip, originating at an angle from the extension end section to which the side wall belongs at a point along said extension end section which is more distant from the first connecting wall than the side wall is, said first lip being snugly receivable in a channel of another identical structural member; and
    a second lip, originating at an angle from the extension end section to which the flange wall belongs at a point along said extension end section which is more distant from the second connecting wall than the flange wall is, said second lip being snugly receivable in a channel of another identical structural member;
    said flange receiving cavity, flange wall, head, flange, notch, channels, first lip and second lip being of dimensions and being adapted such that: the flange receiving cavity is capable of completely receiving the flange of another identical structural member; the second lip is capable of being snugly received within a channel of said another identical structural member; a channel is capable of snugly receiving the first lip of said another identical structural member; and the head of the flange wall is capable of engaging and cooperating with the notch of said another identical structural member, so as to resist separation of the structural member from said another identical structural member.

2. The structural member according to claim 1 wherein the flange includes a base wall which originates from the terminal point of the side wall and extends toward the first connecting wall in a direction parallel to the panels.

3. The structural member according to claim 1 wherein the side wall, the flange wall and the second connecting wall are parallel to each other.

4. The structural member according to claim 3 wherein the side wall is normal to the extension end section to which it belongs.

5. The structural member according to claim 4 wherein the first connecting wall forms an obtuse angle with the extension end section to which the side wall belongs.

6. The structural member according to claim 5 further comprising a reinforcement wall connecting the panels.

7. An end-to-end interlockable structural member for assembling a double wall comprising:
    (a) a pair of spaced apart first and second parallel panels, the panels being staggered in a longitudinal direction so that an extension end section of each panel extends in the longitudinal direction beyond a non-extension end of the other panel;
    (b) a pair of parallel first and second connecting walls, each connecting wall joining the non-extension end of a panel to the other panel;
    (c) a receiving portion extending from the extension end section of the first panel, said receiving portion being defined by said first connecting wall and an extension panel wall co-planar with said first panel;
    (d) a projection portion extending from the extension end section of said second panel; said projection portion including a projection flange spaced from said second connecting wall to accommodate said receiving portion and a base wall which originates from the second connecting wall and extends at an angle towards the first connecting wall in a direction parallel with at least said first panel wall and located adjacent said first extension panel when assembled with an identical panel; and
    (e) means for interlocking said receiving portion with a complementary projection portion on a like panel.

8. The structural member according to claim 7, wherein said means for interlocking said receiving portion with said projection portion includes a lip extending laterally from said flange, a ledge extending from said first connecting wall for overlapping engagement with said lip when said projection portion is inserted into said receiving portion.

9. The structural member according to claim 8, wherein said flange is biased into overlapping engagement with said lip.

10. The structural member according to claim 9 wherein said flange is parallel to said first connecting wall.

11. The structural member according to claim 10 wherein said flange has a distal end and a proximal end, said proximal end being attached to said second panel, said lip being located between said distal end and said proximate end, said ledge being located on said connecting wall for said overlapping engagement with said lip.

12. The structural member according to claim 9 further comprising a fastening means for fastening one panel member to another panel member.

13. The structural member according to claim 12 wherein said fastening means includes a rivet extending through said extension wall and said base wall.

14. The structural member according to claim 13 further comprising an adhesive sealant located between the base wall member and said extension panel to seal internal portions of the double wall panel from exterior.

* * * * *

UNITED STATES PATENT AND TRADEMARK OFFICE
CERTIFICATE OF CORRECTION

PATENT NO. : 5,185,193

DATED : 9 February 1993

INVENTOR(S) : Ronald W. PHENICIE et al.

It is certified that error appears in the above-indentified patent and that said Letters Patent is hereby corrected as shown below:

| Column | Line | |
|---|---|---|
| 1 | 29 | After "site" insert --,--. |
| 1 | 34 | After "assembled" insert --,--. |
| 1 | 50 | Change "air tight" to --airtight--. |
| 2 | 31 | After "bottom container" insert --,--. |
| 2 | 64 | After "FIG. 2" insert --,--. |
| 2 | 65 | After "members" insert --1--. |
| 3 | 43 | After "side wall 13" insert --,--. |
| 3 | 45 | After "panel" insert --2--. |
| 3 | 61 | After "(see FIG. 2)" insert --,--. |
| 4 | 30 | After "cavity" insert --11--. |
| 4 | 34 | After "ledge 10" insert --,--. |
| 4 | 35 | After "position" insert --,--. |
| 4 | 42 | Change "cavity Il" to --cavity 11--. |
| 4 | 66 | Change "Double sided" to --Double-sided--. |

UNITED STATES PATENT AND TRADEMARK OFFICE
CERTIFICATE OF CORRECTION

PATENT NO. : 5,185,193
DATED : 9 February 1993
INVENTOR(S) : Ronald W. PHENICIE et al.

It is certified that error appears in the above-indentified patent and that said Letters Patent is hereby corrected as shown below:

| Column | Line | |
|---|---|---|
| 5 | 3 | After "9" insert --,--. |
| 5 | 23 | After "are of" insert --equal dimensions--. |
| 5 | 46 | After "this way' insert --,--. |
| 5 | 59 | Before "Head" delete "36". |
| 6 | 8 | After "notch 44" change "," to --;--. |
| 6 | 9 | After "FIG. 11" insert --,--. |
| 6 | 67 | Change "90'" to --90°--. |
| 7 | 26 | Change "a end to end" to --An end-to-end--. |

Signed and Sealed this

First Day of March, 1994

Attest:

BRUCE LEHMAN

Attesting Officer     Commissioner of Patents and Trademarks